United States Patent [19]
Yamaki

[11] 3,922,699
[45] Nov. 25, 1975

[54] DIAPHRAGM MECHANISM FOR SINGLE LENS REFLEX CAMERA ADAPTED TO FACILITATE SUBSTITUTION OF INTERCHANGEABLE LENSES

[76] Inventor: Michihiro Yamaki, 617 Iwato, Komae, Tokyo, Japan, 182

[22] Filed: May 3, 1974

[21] Appl. No.: 466,837

[30] Foreign Application Priority Data
May 4, 1973  Japan.............................. 48-49038

[52] U.S. Cl. ................ 354/270; 350/17; 350/206; 354/274
[51] Int. Cl.² ............................................ G03B 9/02
[58] Field of Search ............... 354/196, , 270, 274; 350/17, 206; 352/141, 142; 355/71

[56] References Cited
UNITED STATES PATENTS
2,929,308   3/1960   Swarofsky........................ 354/274
3,657,988   4/1972   Mito ................................ 354/270

*Primary Examiner*—Richard A. Wintercorn
*Attorney, Agent, or Firm*—Brisebois & Kruger

[57] ABSTRACT

A cam equipped with a plurality of cam surfaces for controlling the aperture setting of a camera is rotatably mounted in a camera. A diaphragm ring is coupled to said cam and provided with matching aperture value graduation scales and a plurality of different mounting members equipped with means for controlling the angle of rotation are provided to adapt the camera to accept interchangeable lenses of different makes.

8 Claims, 11 Drawing Figures

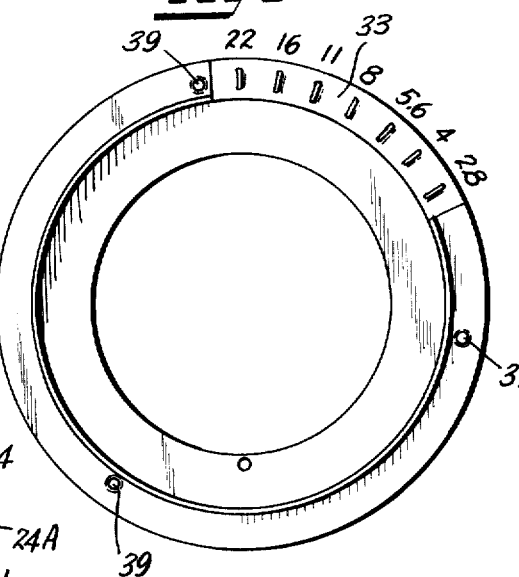
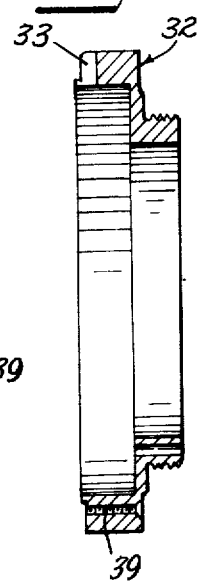
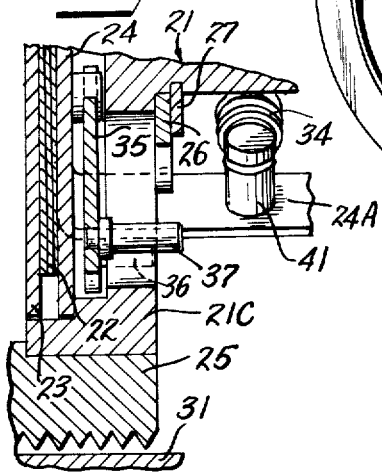
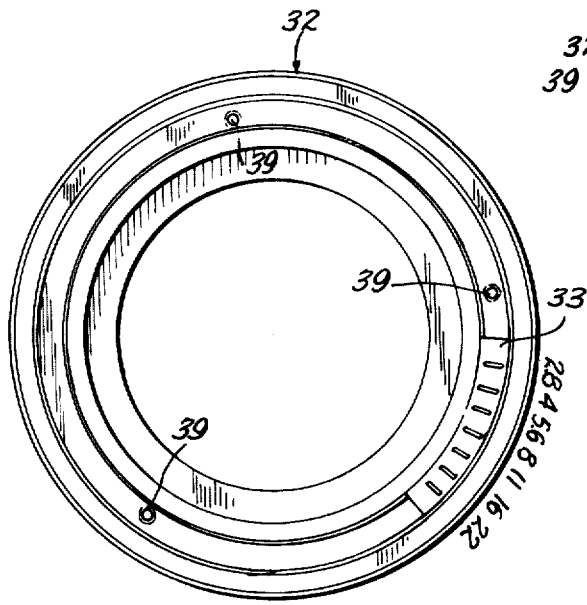
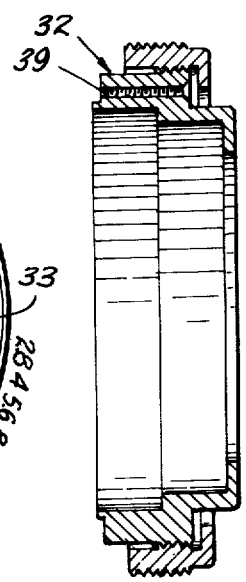

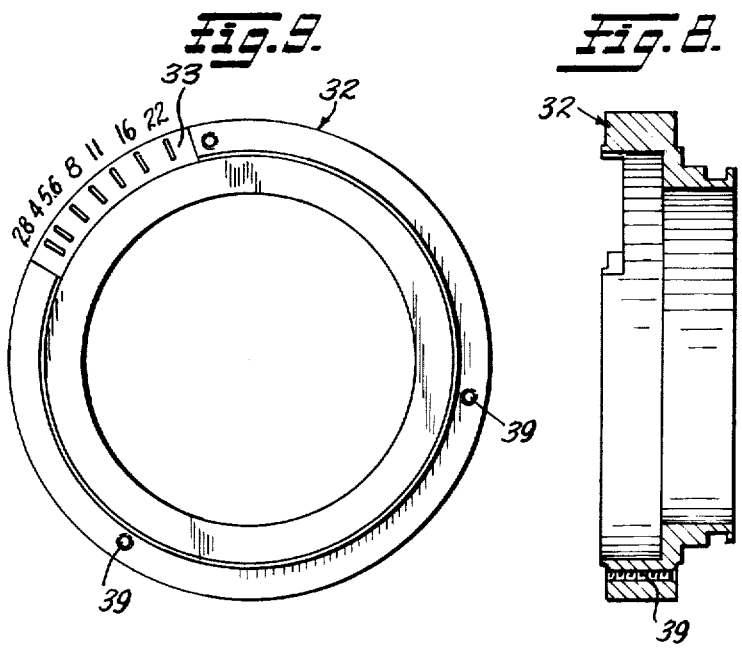
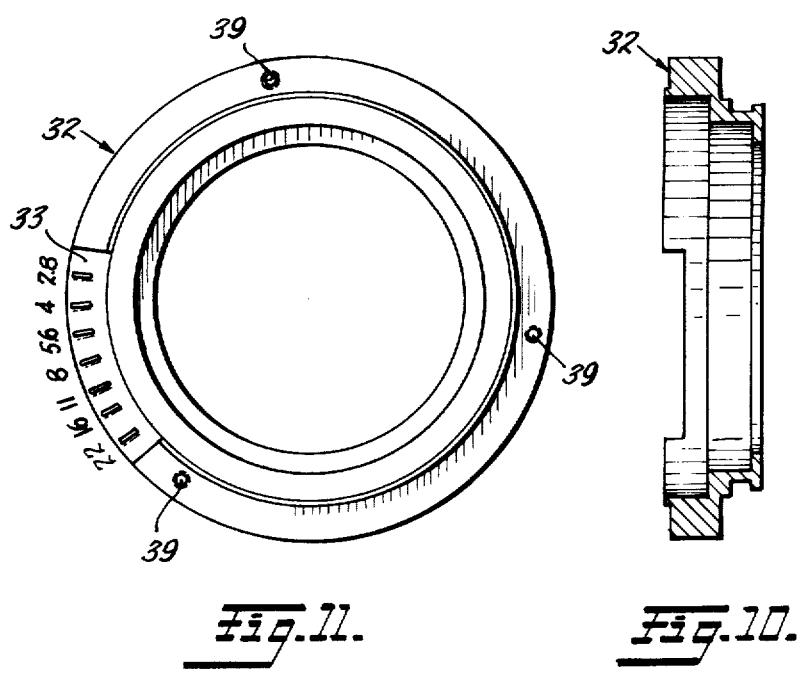

DIAPHRAGM MECHANISM FOR SINGLE LENS REFLEX CAMERA ADAPTED TO FACILITATE SUBSTITUTION OF INTERCHANGEABLE LENSES

BRIEF SUMMARY OF THE INVENTION

As is well known, the intervals of the aperture value graduation scale and the direction of the *f*-numbers series of interchangeable lenses used with open aperture light metering system single lens reflex cameras are, because of the differences in the light metering mechanisms built inside the camera bodies, in the case of cameras and lenses made by different manufacturers.

For that reason, manufacturers specializing in interchangeable lenses who only offer various kinds of interchangeable lenses, are obliged to manufacture many kinds and types of lenses, each adapted only to the cameras of a specific manufacturer. From the production and inventory-control point of view, standardization has become a great problem.

The object of the present invention is to provide a solution for that problem by increasing the number of common features in the critical components and providing a diaphragm mechanism that has a basic structure adapted to standardized production.

Specifically, this invention provides a cam having a plurality of cam surfaces for controlling the aperture setting and is rotatably mounted in the camera, said cam being coupled to a diaphragm ring arranged with aperture value graduation scales that match said cam, together with a mounting member equipped with means for controlling the angle of rotation of the diaphragm ring.

Several representative embodiments of the invention will now be described with reference to the accompanying drawings, in which:

FIG. 3 is an axial sectional view taken through the mounting of FIG. 1, with the outer casing and all lens mounts removed, and in a plane transverse to that of FIG. 1;

FIG. 4 is an axial sectional view through one embodiment of a mounting member according to the invention;

FIG. 5 is an end view, taken from the left of FIG. 4;

FIG. 6 is an axial sectional view through a second embodiment of a mounting member according to the invention;

FIG. 7 is an end view, taken from the left of FIG. 6;

FIG. 8 is an axial sectional view taken through a third embodiment of a mounting member according to the invention;

FIG. 9 is an end view, taken from the left of FIG. 8;

FIG. 10 is an axial sectional view taken through a fourth embodiment of a mounting member according to the invention; and FIG. 11 is an end view taken from the left of FIG. 10.

The four mounting members illustrated in FIGS. 4, 6, 8 and 10 are specifically adapted to the Pentax ES; Canon FTb, F1; Minolta SR and Nikon FTN cameras, respectively.

Figure 1:
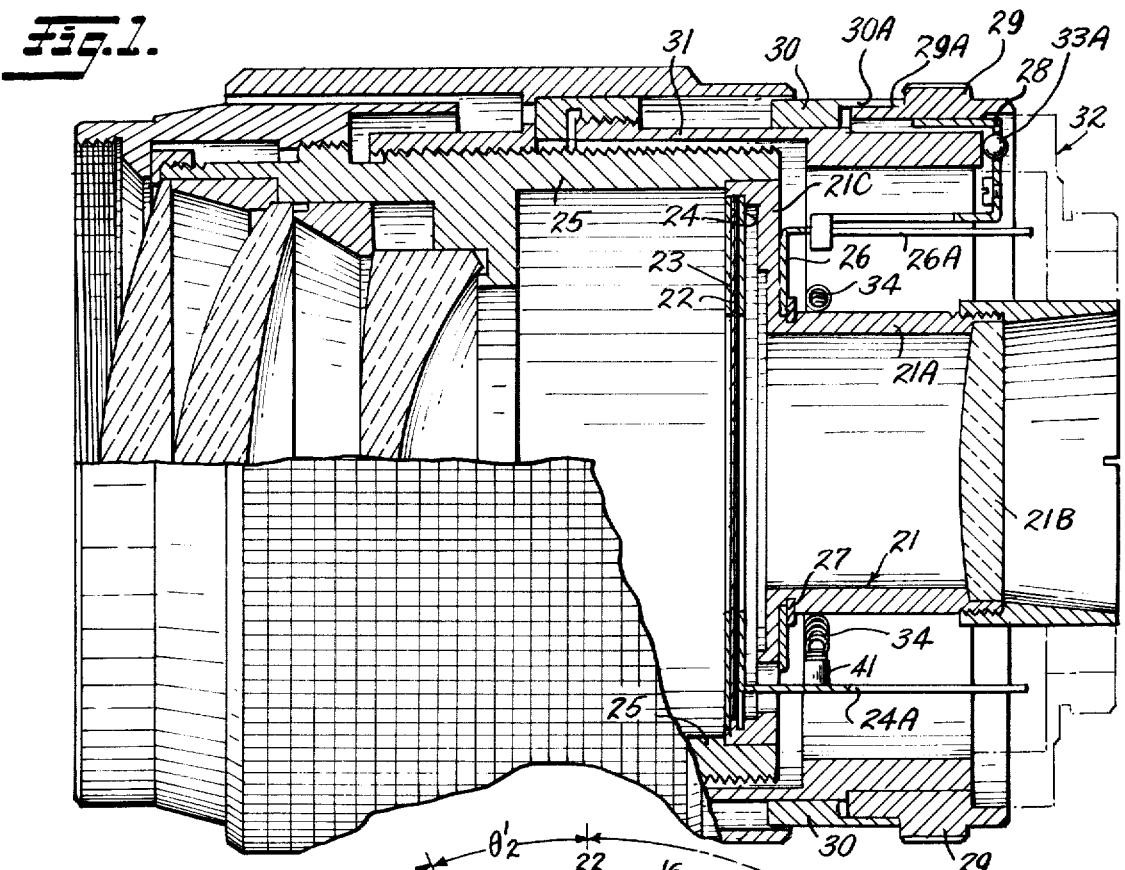
FIG. 1 is an axial sectional view of a lens mounting equipped with my new device.

Referring now to FIG. 1, a diaphragm and lens holder 21 holds at its left end the conventional diaphragm leaves 22, a diaphragm retaining plate 23 and a diaphragm actuating plate 24 from which the diaphragm leaves are actuated in a conventional manner. This diaphragm and lens holder 21 is fixed to a rotatable lens barrel 25, which rotates within a stationary barrel 31. The diaphragm and lens holder 21 comprises a tubular portion 21A which holds the lens 21B, and an annular plate 21C attached to the barrel 25. A cam plate 26 is mounted to rotate freely about the tubular portion 21A while lying flat against the plate 21C. The cam plate 26 is held in place by a retaining ring 27. In the illustrated embodiment the periphery of the cam plate is provided with individual cam surface CF for the Canon FTb, F1, with surface ES for the Pentax ES, surface SR for the Minolta SR, and surface NF for the Nikon FTN. It will of course be appreciated that cam surfaces suited to other cameras could be used instead. An arm 26A fixed to the cam plate 26 and extending toward the front of the camera is held between the arms 28A of a fork attached to the end of a connecting member 28 carried by the diaphragm control ring 29. The ring 29 carries on its circumferential surface at 29A value graduation scales which correspond to the cam surfaces CF, ES, SR and NF.

An index ring 30 having a window 30A is fastened by screws to the stationary lens barrel 31 only after the mounting member next to be described has been mounted in position, and the index ring is then so located that its window shows only the *f*-numbers appropriate to that particular mounting member.

The mounting member 32, shown only in broken lines in FIG. 1, is, as shown in FIG. 4, for example provided with a ribbed segment 33, which cooperates with a ball 33A seated in the slightly resilient connector 28 to act as click stops and resiliently hold the diaphragm control ring 29 in any one of a plurality of selected positions corresponding to which value on the scale 29A is selected. The mounting member 32 is also provided with conventional actuating means (not shown) for transmitting the movement of the automatic aperture operator lever of the camera to the arm 24A attached to the diaphragm actuating plate 24.

Figure 2:
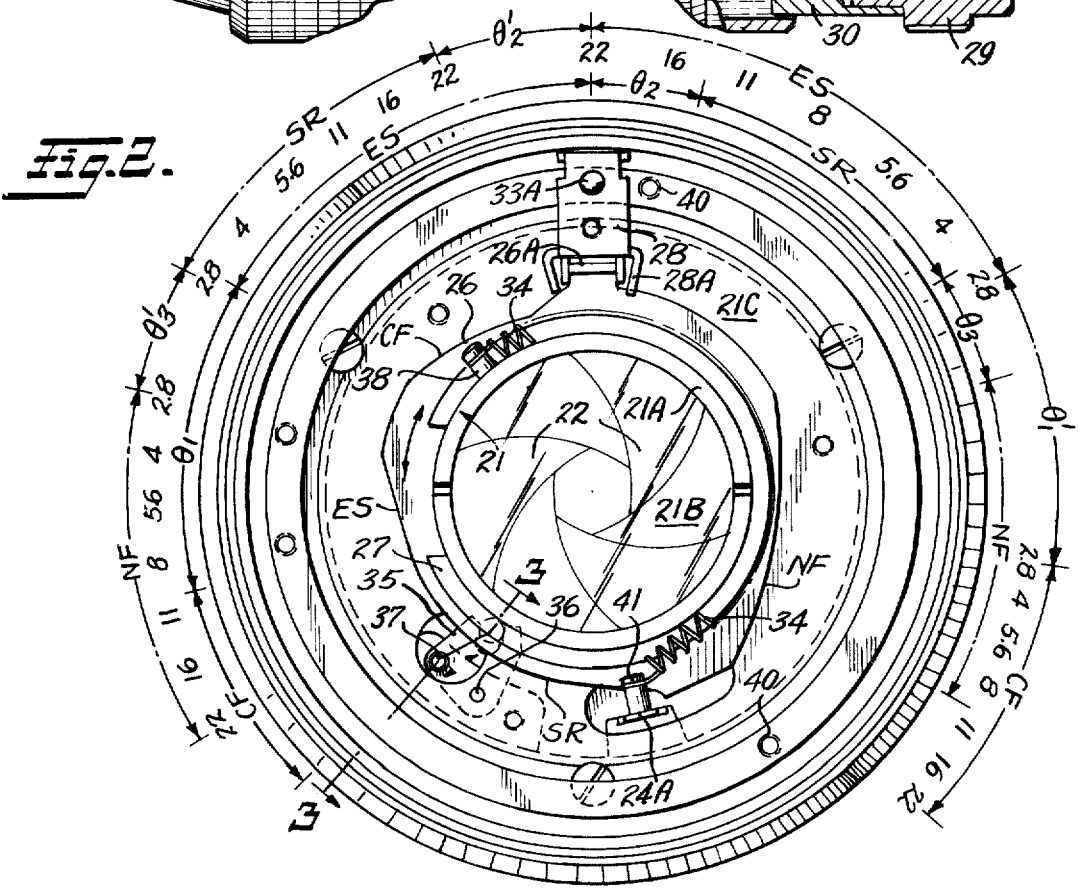
FIG. 2 is an end view, taken from the right of FIG. 1, with the mounting member and the adjacent lens holder removed.

Referring now to FIG. 2, it will be seen that a draw spring 34 extends between a pin 38 on the diaphragm and lens holder 21 and a pin 41 on the arm 24A which projects from the diaphragm actuating plate 24 (as best seen in FIG. 3). A cranked lever 35 is pivotally attached at 36 to the annular plate 21C and lies between that plate and the diaphragm actuating plate 24. One arm of this lever carries a pin 37 which projects through a hole in the annular plate 21C and is biassed against the periphery of the cam plate. The other arm is pivotally attached to the diaphragm actuating plate.

As a consequence, when the shutter button is pressed, the diaphragm leaf operator plate 24 is rotated by spring 34, which draws the arm 24A toward it until the actuating plate has been moved far enough to swing the pin 37 into contact with the particular cam surface on the cam plate which the device has been assembled to place in effective position.

The device is assembled in the following manner. The particular mounting member appropriate to the selected camera is fastened by means of screws passing through holes 39 in the mounting member into threaded holes 40 in the end of the stationary lens 31, at the proper position. Next, after the index ring 30 has been set to indicate the aperture value graduation scale 29A of the camera which is to appear at the window 30A, the index ring is fastened by means of screws to the stationary lens barrel 31 in that set position.

Then when the shutter button is pressed, the diaphragm leaf actuating plate 24 is rotated as described above by the draw spring 34 until the pin 37 on the lever strikes the matching cam surface and thereby locates the diaphragm leaves in a position corresponding to the indicated f-number.

It will be appreciated that the selection and mounting of a particular mounting member determines the particular cam surface which will be effective since the location of the surface 33 in the mounting member with respect to the screw holes 39 in the mounting member determines the range through which the ring 29 can move the arm 28 and thus the arm 26A which positions the cam. This, in turn, determines the diameter of the opening defined by the diaphragm leaves 22 which is produced when the shutter button is pressed, with the ring 29 at any particular position in the range permitted to it by the particular mounting member, to permit rotation of the diaphragm leaf actuating plate 24 by the draw spring 34. The shutter button may cause this rotation in any conventional way. For example, a pivotally mounted stop may be provided which holds the arm 24A against the pull of the draw spring, and is then swung out of the part of travel of the arm 24A when the shutter button is pressed. It will likewise be appreciated that the contour of each cam surface is adapted to the specific requirements of the particular camera the mounting means for which will bring that cam surface into contact with the pin 37 on the lever 35. The ring 30 is then so mounted that the scale exposed will accurately indicate the effect on the diaphragm leaves produced when the shutter button is pressed with the ring 29 in each position within the range permitted by the particular mounting member in use.

What is claimed is:

1. In a lens attachment for a camera comprising an adjustable aperture-defining diaphragm and a rotatable actuating plate connected to actuate said diaphragm when rotated, said diaphragm and plate being mounted on a common axis, the improvement which comprises:
    a cam plate rotatably mounted on said common axis and having a plurality of distinct peripheral cam surfaces having different contours,
    mounting means for connecting said attachment to a camera,
    diaphragm control means mounted to engage a peripheral cam surface and connected to limit the rotation of said actuating plate in dependence on the point at which said diaphragm control means engages said cam surface,
    interengaging means carried by said cam plate and said mounting means respectively for rotating said cam plate, and limit means on said mounting means for restricting the movement of said interengaging means and consequently of said cam plate to a selected one of a plurality of predetermined ranges, in each of which said diaphragm control means engages only a selected one of said peripheral cam surfaces.

2. An attachment as claimed in claim 1 comprising spring-biassed means for rotating said actuating plate to alter the aperture defined by said diaphragm.

3. An attachment as claimed in claim 1 in which said means for rotating said cam plate also comprises an adjusting ring encircling said common axis and carrying on its periphery indicia indicative of the aperture opening, and said attachment comprises also a window ring encircling the indicia bearing periphery of said adjusting ring and adjustably attached to said attachment so that only a selected portion of said indicia are visible through said window in any one position of said window ring.

4. An attachment as claimed in claim 1 in which said cam surface engaging means comprises a cranked lever mounted to rotate about fixed point on said attachment, said lever having a first arm pivotally connected to said actuating plate and a second arm carrying a pin which engages said cam.

5. An attachment as claimed in claim 1 comprising a plurality of interchangeable mounting means each adapted to limit the rotation of said cam plate in dependence on the aperture value graduation scale of a different make of camera.

6. An attachment as claimed in claim 5 in which the contour of each cam surface is adapted to reflect the aperture value graduation scale of a different one of said makes of cameras.

7. An attachment as claimed in claim 1 in which said interengaging means comprise an arm attached to said cam plate and parallel to said axis, and a fork member fixed to an adjusting ring carried by said mounting means.

8. An attachment as claimed in claim 7 in which said interengaging means comprise a click-stop surface on a stationary portion of said mounting means which engages a ball resiliently supported by said fork member.

* * * * *